United States Patent [19]

Whitehurst et al.

[11] Patent Number: 5,328,009
[45] Date of Patent: Jul. 12, 1994

[54] ENGINE STARTER DRIVE SHAFT LUBRICATOR

[75] Inventors: James L. Whitehurst, Hartford City; Victor L. Kelley, Chesterfield; Brian W. Harris, Anderson, all of Ind.

[73] Assignee: General Motors Corporation, Detroit, Mich.

[21] Appl. No.: 3,044

[22] Filed: Jan. 11, 1993

[51] Int. Cl.⁵ .......................... F02N 15/06; F16N 7/12
[52] U.S. Cl. .................................... 192/42; 192/113.5; 74/7 C; 184/102
[58] Field of Search .................... 74/7 R, 7 C; 192/42, 192/113 P; 184/16, 19, 22, 25, 102

[56] References Cited

U.S. PATENT DOCUMENTS

| Re. 14,707 | 8/1919 | Arbuckle | 184/19 X |
|---|---|---|---|
| 1,166,205 | 12/1915 | Heaslet | 192/42 |
| 1,552,876 | 9/1925 | Paxton | 184/25 |
| 2,902,125 | 9/1959 | House et al. | 192/45 |
| 3,058,144 | 10/1962 | Schotsch | 184/16 |
| 4,748,862 | 6/1988 | Johnston | 74/7 R |
| 4,895,234 | 1/1990 | Fujimo | 192/42 |
| 4,995,275 | 2/1991 | Okamoto et al. | 74/7 R X |
| 5,054,329 | 10/1991 | Morishita et al. | 74/7 R |

FOREIGN PATENT DOCUMENTS 57-9331  1/1982  Japan ......................... 74/7 R Primary Examiner—Richard M. Lorence
Attorney, Agent, or Firm—Creighton R. Meland

[57] ABSTRACT

A lubricator for lubricating the drive shaft of engine starting apparatus. The lubricator has a housing that is comprised of two plastic parts that are secured together by means of locking arms that are integral with one of the parts and which engage the outer part. The housing contains a wick that is saturated with a lubricating oil. The lubricator is assembled to the driving member of an engine starter overrunning clutch by press-fitting it to an internal surface of a tubular portion of the driving member. The inner surface of the wick engages a starter drive shaft and as the overrunning clutch is shifted relative to the drive shaft, the wick deposits a thin film of oil to a length of the drive shaft.

6 Claims, 2 Drawing Sheets

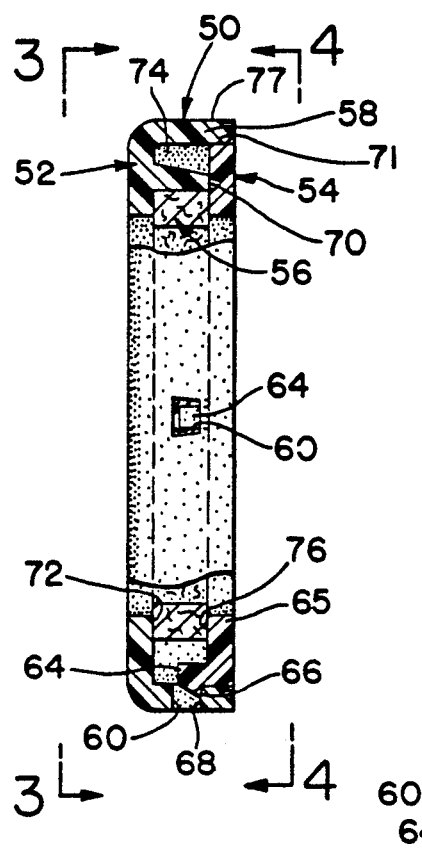
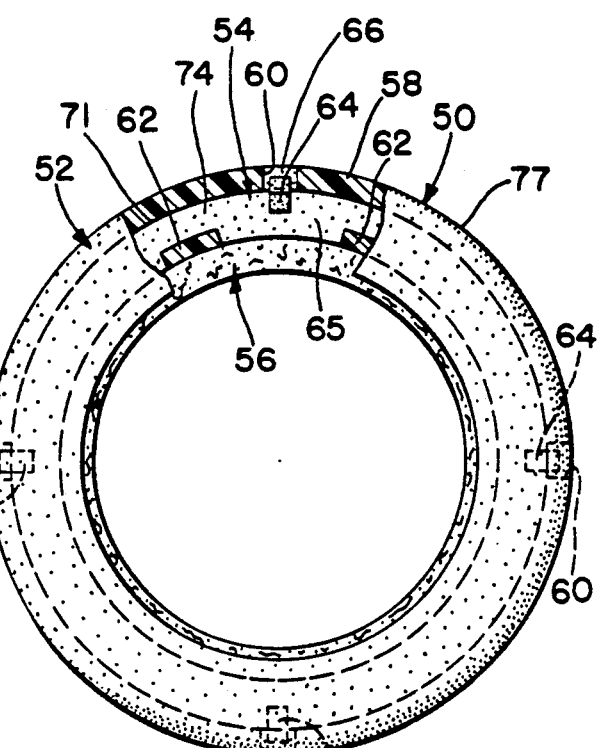
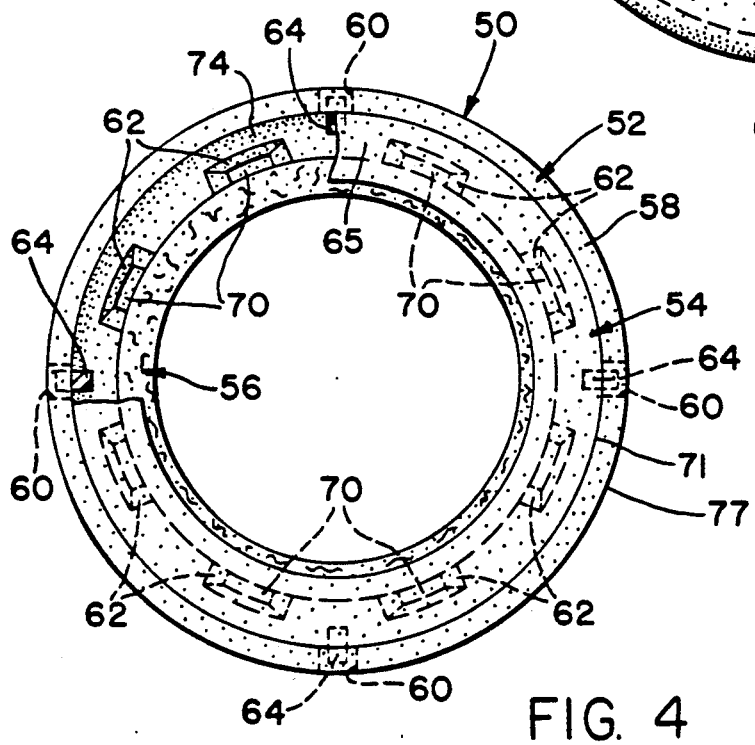
FIG. 2
FIG. 3
FIG. 4

ENGINE STARTER DRIVE SHAFT LUBRICATOR

This invention relates to a lubricator for lubricating an engine starter drive shaft that carries a pinion that is moved along the starter drive shaft when the pinion is moved into or out of mesh with the ring gear of an engine to be cranked.

Starter drives that are carried by a drive shaft and which include an overrunning clutch and pinion that is carried by the drive shaft which is shifted relative to the shaft into and out of mesh with the ring gear of an engine are well known, one example being the starter drive shown in the U.S. patent to House et al., U.S. Pat. No. 2,902,125. In such starter drives, the pinion has internal sleeve or bushing-type bearings that are journalled on the shaft.

The drive shaft of an engine starter is exposed to road splash through the opening in the drive housing that is provided to permit the pinion to mesh with the ring gear of the engine. This, among other things, can cause the drive shaft to corrode. Further, since the drive shaft is not lubricated, the corrosion and lack of lubrication can cause the pinion bushings to wear excessively and extrusion of the bushings may occur. The net effect of this is that the force required to shift the pinion relative to the drive shaft increases and the performance of the engine starter goes down. The increase in pinion shifting force caused by corrosion and lack of lubrication may be so high as to cause the voltage specification, for voltage applied to the starter solenoid for proper operation, to be exceeded.

It, accordingly, is a general object of this invention to provide a starter drive that has a pinion that is carried by a drive shaft and where the starter drive has means for lubricating a length of the drive shaft that is traversed by the pinion. In carrying this object forward, a driving member of an overrunning clutch carries a lubricating device. This lubricating device has a housing that contains an annular lubricating wick that is saturated with a lubricating oil. The housing of the lubricating device is press-fitted to the driving member of the overrunning clutch and the wick contacts the drive shaft. As the overrunning clutch is shifted to move the pinion into and out of mesh with the ring gear of an engine, the wick deposits a thin film of oil to the drive shaft.

IN THE DRAWINGS

FIG. 2 is an enlarged sectional view of a lubricator made in accordance with this invention.

FIG. 3 is an end view of the lubricator shown in FIG. 2 looking in the direction of arrows 3—3 in FIG. 2.

FIG. 4 is an end view of the lubricator shown in FIG. 2 looking in the direction of arrows 4—4 in FIG. 2.

Figure 1:
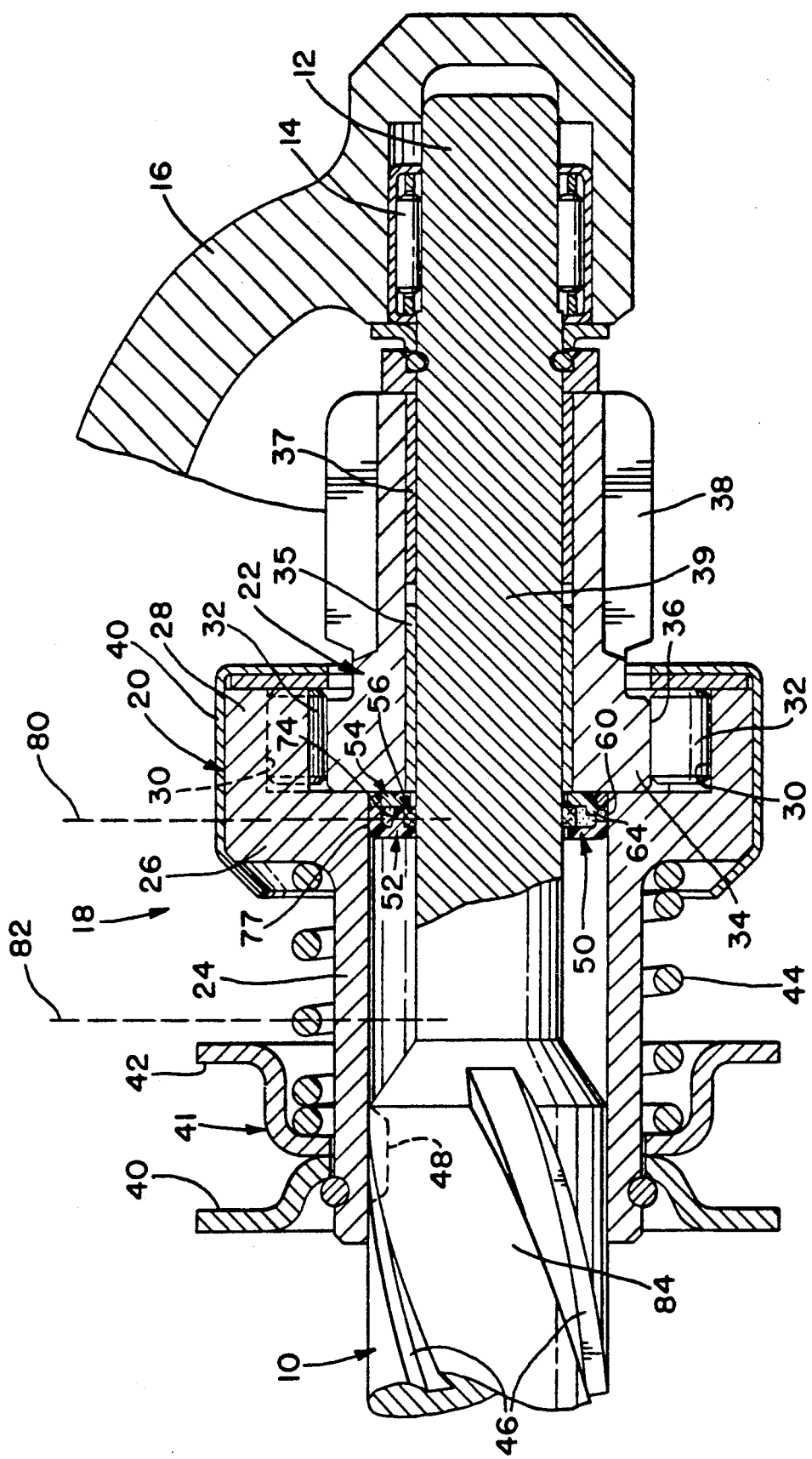
FIG. 1 is a sectional view of an engine starting apparatus that includes an overrunning clutch that has a drive shaft lubricator made in accordance with this invention.

Referring now to the drawings and more particularly to FIG. 1, an engine starter drive shaft generally designated as 10 is illustrated. The portion 12 of drive shaft 10 is journalled for rotation in a bearing 14 that is supported by a drive housing 16 of an engine starter. The left end of shaft 10 (not illustrated) extends into the armature of an electric cranking motor so that shaft 10 is driven by the armature of the cranking motor when the cranking motor is energized.

A starter drive which is generally designated as 18 is shown in FIG. 1 supported by drive shaft 10. The starter drive has an overrunning clutch. The driving member of the overrunning clutch is designated as 20 and the driven member of the clutch as 22. The driving member 20 comprises a tubular axially extending portion 24, an annular radially extending portion 26 and an annular axially extending portion 28. The annular portion 28 has a plurality of circumferentially spaced recesses 30 that each contain a clutch roller 32 and a spring which is not illustrated.

The driven member 22 of the overrunning clutch has a portion 34 that has an outer cylindrical surface 36 that engages the rollers 32. The driven member 22 has a pinion gear 38 that meshes with the ring gear of an engine. The overrunning clutch has a metal outer shell 40.

The driven clutch member 22 carries two annular sleeve-type bushing bearings 35 and 37 that may be formed of bronze. These bushings are journalled on a portion 39 of drive shaft 10.

The starter drive 18 has a collar 41 comprised of parts 40 and 42. This collar cooperates in a known manner with the shift lever of an engine starter. A jump spring 44 is disposed between collar part 42 and an outer surface of portion 26 of driving clutch member 20.

The drive shaft 10 and the driving member 20 are connected by a helical splined connection comprised of helical splines 46 and 48.

The starter drive has a lubricator which is generally designated as 50. This lubricator is shown assembled to the starter drive 18 in FIG. 1 and is shown enlarged and in detail in FIGS. 2–4.

The lubricator 50 has a housing that is comprised of parts 52 and 54. This housing contains wick 56. The wick 56 can be formed of felt or a sponge material.

The housing parts 52 and 54 are both molded plastic parts and may be formed of glass-filled nylon.

The part 52 has an annular wall 58 that has four circumferentially spaced slots, each designated as 60, that extend through wall 58. The part 52 further has eight circumferentially spaced and axially extending teeth, each designated as 62.

The part 54 has four circumferentially spaced and axially extending lock arms, each designated as 64, that extend from an annular wall portion 65 of part 54. Each lock arm has a surface or lock shoulder 66 which engages a surface 68 on one side of slot 60. The part 54 is fitted to part 52 by pushing these parts together. As the parts are pushed together, portions of the lock arms 64 snap into the slots 60 with surfaces 66 engaging surfaces 68 to thereby secure part 54 to part 52.

When part 54 is secured to part 52, the end surfaces 70 of teeth 62 tightly engage inner surface portions of part 54. Further, an outer annular surface 71 on part 54 tightly engages an internal surface on portion 58 of part 52.

The manner in which the lubricator 50 is assembled and supplied with lubricating oil will now be described. Prior to assembly, the parts 54 and 52 have not been secured together. The wick 56 is saturated with oil and is then inserted into part 52 to the position shown in FIG. 2. In this position, a portion of wick 56 engages and rests on an annular surface 72 on part 52. The outer annular surface of wick 56 engages inner surfaces of teeth 62.

With the wick positioned in part 52, as has been described, a cavity or reservoir 74 outside of teeth 62 and outside of wick 56 is filled with oil. The part 54 is now secured to part 52 in a manner that has been described. The wick 56 is now clamped between surface 72 on part 52 and surface 76 on part 54. The cavity 74 operates as a reservoir for oil. This oil is in contact with outer surface portions of wick 56 that are located between teeth 62. This cavity or reservoir 74 is defined by teeth 62, wick 56, annular wall 58 and annular wall portion 65 of part 54.

When the lubricator 50 has been assembled, it is assembled to the starter drive 18 shown in FIG. 1 before the starter drive 18 is assembled to the drive shaft 10. The lubricator 50 is pushed into the tubular portion 24 of driving clutch member 20 to the position shown in FIG. 1, where the part 54 of lubricator 50 engages an annular end surface of driven clutch member 22. The outer cylindrical surface 77 of part 52 has a press-fit with a portion of the internal cylindrical surface of tubular portion 24 of driving clutch member 20. The fit is tight enough that the lubricator 50 does not shift relative to tubular portion 24 when tubular portion 24 is shifted relative to drive shaft 10.

The starter drive 18 is shown in FIG. 1 in a position in which pinion gear 38 is meshed with the ring gear of an engine. The dotted line 80 is aligned with the wick 56 in FIG. 1 and represents the position of wick 56 when the pinion gear 38 is meshed with the ring gear of the engine. The internal surface of wick 56 engages the drive shaft 10. When the pinion gear 38 is moved out of mesh with the ring gear to a fully retracted at-rest position, the wick 38 becomes aligned with dotted line 82. The distance between dotted lines 82 and 80 may be about 17.9 mm. so that a length of a drive shaft of about 17.9 mm. will be wiped and lubricated by wick 56 each time the pinion is moved into mesh with the ring gear and each time the pinion is moved out of mesh with the ring gear.

When an engine is to be cranked, the shift lever of the engine starter moves the collar 41, to the right in FIG. 1. The collar causes the driving member 20 to move to the right in FIG. 1 by the force the collar applies to jump spring 44. As driving clutch member 20 moves to the right in FIG. 1, it rotates relative to drive shaft 10 due to the helical splined connection between portion 24 and drive shaft 10 to facilitate meshing of pinion gear 38 with the ring gear of the engine. As part 20 rotates, the wick is rotated slightly. Therefore, the wick 56 rotates and slides axially relative to shaft 10 and the wick wipes the shaft to apply oil to a length of the shaft corresponding to the distance between dotted lines 82 and 80. The length and position of bushings 35 and 37 is such that bushing 35 will overlie the entire lubricated length of the drive shaft and a small length of the left end of bushing 37 will also overlie a portion of the lubricated length of the drive shaft when the pinion is in its fully retracted position. Therefore, bushing 35 will be lubricated over its entire length and bushing 37 will be lubricated over a portion of its length. When shaft 10 is rotatably driving clutch member 20 through splines 46 and 48, that is, when pinion gear 38 is meshed with the engine ring gear, the shaft 10, clutch member 20 and lubricator 50 all rotate together.

The wick 56 applies a thin film of oil to the length of the drive shaft between lines 82 and 80. The wick is replenished with oil by the oil that is contained in the cavity or reservoir 74. It should be noted that the outer ends of slots 60 are closed by the inner cylindrical surface of tubular portion 24 of driving clutch member 20. This helps to retain oil in the cavity 74. Some oil in cavity 74 may pass around locking arms 64 and through slots 60 where it would contact the internal surface of tubular portion 24. This oil would tend to lubricate the larger diameter splined portion 84 of shaft 10.

The type of lubricating oil that is used to saturate wick 56 and fill cavity 74 may be an SAE 20 non-detergent oil. As previously mentioned, the wick 56 can be formed of felt or a sponge material. The type of wick and the type of oil that are used should provide for adequate lubrication of the drive shaft over a lengthy time period.

Some of the advantages of this invention are listed as follows:

1) By applying a lubricant to the drive shaft, corrosion of the drive shaft in the pinion bushing area is prevented and the life of the bushings is prolonged.

2) By lubricating the drive shaft, the amount of force required to shift the pinion is reduced since friction between the pinion bushings and the drive shaft is reduced.

3) The addition of the lubricator to the starter drive does not increase the length of the engine starter and does not require that the starter drive have a larger diameter.

The embodiments of the invention in which an exclusive property or privilege is claimed are defined as follows:

1. An engine starting apparatus having a drive shaft lubricator comprising in combination, a drive shaft, a driving clutch member supported by said drive shaft, means connecting said driving clutch member to said drive shaft whereby said drive shaft rotatably drives said driving clutch member, a driven clutch member including a pinion gear supported by said drive shaft, at least one bearing bushing disposed between said driven clutch member and said drive shaft, and lubricating means supported by said driving clutch member including annular wick means that is impregnated with a lubricant, said wick means engaging said drive shaft whereby said wick means applies lubricant to said drive shaft over a predetermined length of said drive shaft as said driving and driven clutch membes are shifted axially with respect to said drive shaft.

2. The engine starting apparatus according to claim 1 where said lubricant is oil.

3. The engine starting apparatus according to claim 1 where said annular wick means is supported by a housing means, said housing means having an outer surface that has a press-fit with an internal surface of said driving clutch member.

4. The engine starting apparatus according to claim 1 where said annular wick means is supported by a housing means, said housing means engaging an end surface of said driven clutch member, said housing means having an outer surface that has a press-fit with an internal surface of said driving clutch member.

5. A lubricator that is adapted to be press fitted to an internal surface of a tubular portion of a driving clutch member of an overrun clutch for lubricating a drive shaft of engine starting apparatus comprising, a housing comprised of first and second parts, said first part having an annular outer axially extending annular wall, the outer surface of said outer axially extending annular wall adapted to be press fitted in said driving clutch member, said second part having an annular wall, means for securing said second part to said first part comprising internal locking arms on one of said parts that engages the other part, and an annular lubricating wick located inside one of said parts and between inner surfaces of said parts, said wick having an annular internal surface that is adapted to engage a drive shaft of engine starting apparatus to apply lubricant to said drive shaft.

6. A lubricator that is adapted to be press fitted to an internal surface of a tubular portion of a driving clutch member of an overrunning clutch for lubricating a drive shaft of engine starting apparatus comprising, a housing comprised of first and second parts, said first part having an annular outer axially extending annular wall, the outer surface of said outer axially extending annular wall adapted to be press fitted to said driving clutch member, said second part having an annular wall, said first part further having a plurality of circumferentially spaced and axially extending teeth, the ends of said teeth engaging said second part, said second part further having a surface that engages said outer axially extending wall of said first part, means securing said second part to said first part, and an annular lubricating wick located inside of said teeth with an outer surface of said wick engaging inner surfaces of said teeth, the area outside of said wick and teeth providing a reservoir for lubricant, said wick having an annular internal surface that is adapted to engage a drive shaft of engine starting apparatus to apply lubricant to said drive shaft.

* * * * *